US010089268B2

(12) United States Patent
Bunte et al.

(10) Patent No.: US 10,089,268 B2
(45) Date of Patent: Oct. 2, 2018

(54) NETWORK SUBSCRIBER (71) Applicant: BECKHOFF AUTOMATION GMBH, Verl (DE)

(72) Inventors: Thorsten Bunte, Guetersloh (DE); Holger Buettner, Berlin (DE); Erik Vonnahme, Salzkotten (DE); Dirk Janssen, Verl (DE); Thomas Rettig, Rheda-Wiedenbrueck (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 63 days.

(21) Appl. No.: 14/996,798

(22) Filed: Jan. 15, 2016

(65) Prior Publication Data

US 2016/0132446 A1 May 12, 2016

Related U.S. Application Data

(63) Continuation of application No. PCT/EP2015/057334, filed on Apr. 2, 2015.

(30) Foreign Application Priority Data

Apr. 29, 2014 (DE) .................... 10 2014 106 019

(51) Int. Cl.
*G06F 13/362* (2006.01)
*H04L 12/40* (2006.01)
*G06F 1/10* (2006.01)

(52) U.S. Cl.
CPC .............. *G06F 13/362* (2013.01); *G06F 1/10* (2013.01); *H04L 12/40013* (2013.01)

(58) Field of Classification Search
CPC ........................................................ G06F 13/38
USPC ........................................................ 710/113
See application file for complete search history.

(56) References Cited

U.S. PATENT DOCUMENTS 6,466,572 B1 * 10/2002 Ethridge .............. H04B 10/272
370/352
6,650,649 B1    11/2003 Muhammad et al.
7,656,787 B2    2/2010 Zehentner
8,705,527 B1 *  4/2014 Addepalli ............. H04W 4/046
370/389

(Continued)

FOREIGN PATENT DOCUMENTS

CN   101132328 A   2/2008
DE   19742716 A1   4/1999

(Continued)

OTHER PUBLICATIONS

Office Action for Chinese Patent Application No. 201580001682.0, dated May 7, 2018, English translation (8 pages).

(Continued)

*Primary Examiner* — Titus Wong
(74) *Attorney, Agent, or Firm* — Dorsey & Whitney LLP (57) ABSTRACT A network subscriber comprises a plurality of individual functional units, each individual functional unit comprising an application interface. The network subscriber further comprises a network subscriber comprises at least a shared functional unit, a first interface for establishing a physical connection and a second interface for establishing a further physical connection.

19 Claims, 3 Drawing Sheets

(56) References Cited

U.S. PATENT DOCUMENTS

| | | | | |
|---|---|---|---|---|
| 2005/0099949 A1* | 5/2005 | Mohan | ............... | H04L 47/10 |
| | | | | 370/236.2 |
| 2008/0072098 A1 | 3/2008 | Hunsaker et al. | | |
| 2009/0049207 A1 | 2/2009 | Reynolds et al. | | |
| 2010/0241773 A1* | 9/2010 | Rostan | ............ | H04L 12/403 |
| | | | | 710/110 |
| 2014/0213219 A1* | 7/2014 | Mohebbi | ............ | H04W 92/02 |
| | | | | 455/411 |

FOREIGN PATENT DOCUMENTS

| | | |
|---|---|---|
| DE | 10221652 A1 | 4/2003 |
| DE | 10321652 A1 | 12/2004 |
| DE | 102010062065 A1 | 5/2012 |
| EP | 2456133 B1 | 7/2014 |
| GB | 2473142 A | 3/2011 |
| WO | 9114324 A1 | 9/1991 |
| WO | 2010104930 A1 | 9/2010 |

OTHER PUBLICATIONS

SIEMENS, "Industrial Ethernet Switches SCALANCE X-400 Operating Instructions," Simatic Net, Mar. 2009 (156 pages).
SIEMENS, "Distributed I/O System ET 200S Operating Instructions," SIMATIC, Aug. 2008 (164 pages).
Opposition Letter for European Patent No. 3008859, dated Nov. 20, 2017 (27 pages).

* cited by examiner

Fig. 1

PRIOR ART

NETWORK SUBSCRIBER

CROSS-REFERENCE TO RELATED APPLICATIONS

This application claims priority to PCT Application PCT/EP2015/057334, filed Apr. 2, 2015, entitled NETWORK SUBSCRIBER, and German Patent Application DE 10 2014 106 019.9, filed Apr. 29, 2014, entitled NETZWERKTEIL-NEHMER, each of which is incorporated by reference herein, in the entirety and for all purposes.

FIELD

The present invention relates to a network subscriber.

BACKGROUND

Data networks are known from the prior art. Cable-based data networks according to the prior art are frequently based on the Ethernet standard. Furthermore, it is known in the prior art that the preamble "industrial Ethernet" refers to the use of Ethernet data networks for networking devices in industrial manufacturing and automation technology. Such data networks may e.g. be based on the EtherCAT standard according to IEC standard "IEC 61158."

Data networks consist of a plurality of interlinked network subscribers. In this context, the network subscribers may e.g. be arranged in a ring or line topology. In such data networks, data packets are guided through all network subscribers of the data network. A full cycle of a data packet via all network subscribers of the data network requires a cycle time. The passage times required for the wheeling of a data packet through the individual network subscribers form an essential part of that cycle time. Said passage times essentially contribute to limiting the minimum achievable passage times.

SUMMARY

The invention provides an improved network subscriber.

EXAMPLES

According to one aspect, a network subscriber comprises a plurality of individual functional units, each individual functional unit comprising an application interface. The network subscriber further comprises a network subscriber comprises at least a shared functional unit, a first interface for establishing a physical connection and a second interface for establishing a further physical connection.

According to a further aspect, a network subscriber comprises a plurality of individual functional units, each individual functional unit comprising a memory-managing unit. The network subscriber further comprises a network subscriber comprises at least a shared functional unit, a first interface for establishing a physical connection and a second interface for establishing a further physical connection.

According to a further aspect, a network subscriber comprises a plurality of individual functional units, at least a shared functional unit, a first interface for establishing a physical connection, a second interface for establishing a further physical connection and a managing interface for managing the first interface and/or the second interface.

BRIEF DESCRIPTION OF THE DRAWINGS

The invention will be explained in more detail below with reference to figures, in which, in each case in a schematic illustration.

DETAILED DESCRIPTION

Figure 1:
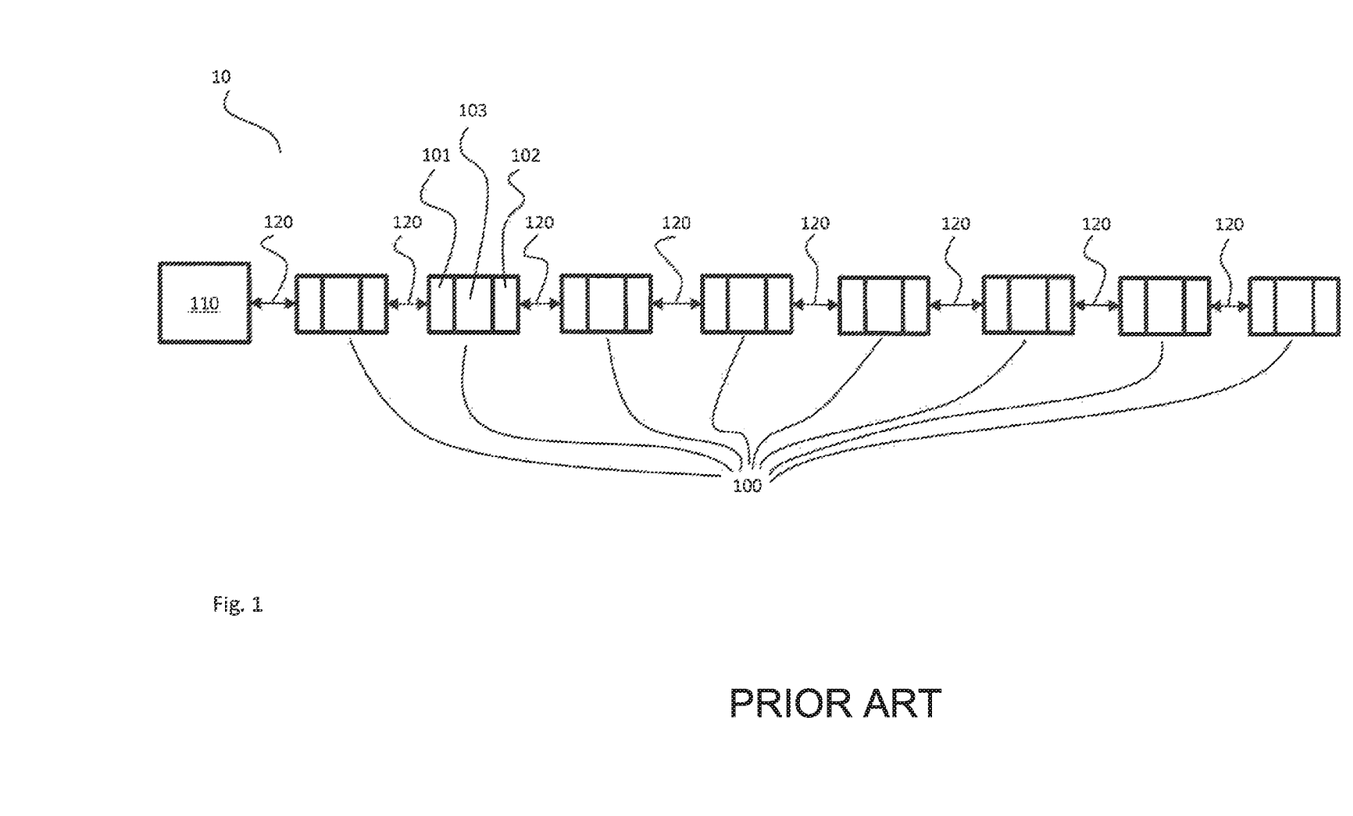
FIG. 1 shows a first network having a plurality of network subscribers.

FIG. 1 shows a schematic view of a first network 10 known from the prior art. The first network 10 is a data network serving to transmit data between network subscribers of the first network 10. The first network 10 may be a wireless network or a cable-based network. The first network 10 may e.g. be a network based on the Ethernet standard. The first network 10 may serve to interlink devices in industrial manufacture and/or for control or automation purposes. The first network 10 may e.g. be a network according to the EtherCAT standard.

The first network 10 comprises a plurality of slave-network subscribers 100 and a master-network subscriber 110. The network subscribers 100, 110 of the first network 10 are connected with each other via connections 120.

In the depicted example, the first network 10 has a line topology. The line topology of the first network 10 may be perceived as an open ring topology. The connections 120 between the network subscribers 100, 110 of the first network 10 are configured as one-point and two-point connections. The master-network subscriber 110 of the first network 10 is connected to one of the slave-network subscribers 100 via a connection 120. The slave-network subscribers 100 are arranged behind one another in a chain so that each slave-network subscriber 100, expect for the first slave-network subscriber 100 and the last slave-network subscriber 100 of the chain, comprises connections 120 to two adjacent slave-network subscribers 100. However, it would also be possible to configure the first network 10 with a different topology, e.g. with a star topology, a tree topology or a mixed topology.

If the first network 10 is an EtherCAT network, the slave-network subscribers 100 of the first network 10 may be EtherCAT-slave controllers. The slave-network subscribers 100 may serve as an interface with the slave-application devices. For example, the slave-network subscribers 100 may be configured for connecting EtherCAT-application controllers.

The master-network subscribers 110 of the first network 10 may be configured to take over control and management tasks within the first network 10. For example, the master-network subscriber 110 may be designed to configure the slave-network subscriber 100 of the first network 10 and to coordinate a data communication within the first network 10.

Each of the slave-network subscribers 100 of the first network 10 comprises a first interface 101 for establishing a physical connection and a second interface 102 for establishing a physical connection. The first interface 101 and the second interface 102 serve to establish the connections 120. The first interface 101 and the second interface 102 may e.g. be configured as Ethernet interfaces. The first interface 101 and the second interface 102 may also be referred to as PHYs or comprise PHYs.

Moreover, each slave-network subscriber 100 of the first network 10 comprises a processing unit 103. If the slave-network subscribers 100 are EtherCAT-network subscribers, the processing unit 103 may also be referred to as an EtherCAT-processing unit. The processing unit 103 of each slave-network subscriber 100 serves to analyse and process data packets received via the first interface 101 and/or the second interface 102. In this context, the processing unit 103 particularly handles a data exchange with a slave-application device connected to the respective slave-network subscriber 100.

In the first network 10, data packets are transmitted starting from the master-network subscriber 100 and forwarded along the chain of slave-network subscribers 100 via the connections 120 to the last slave-network subscriber 100 of the chain of slave-network subscribers 100 of the first network 10 before they are returned by said slave-network subscriber 100 to the master-network subscriber 110 of the first network 10 via the chain of slave-network subscribers 100.

In this context, each data packet is received via the first interface for establishing a physical connection on the forward run when cycling through a slave-network subscriber 100, processed by the processing unit 103 of the respective slave-network subscriber 100 and forwarded to the subsequent slave-network subscriber 100 via the second interface for establishing a physical connection. On the way back, the data packet is correspondingly processed in reverse order.

The passage time of the data packet when cycling through a slave-network subscriber 100 may in this context e.g. amount to about 500 ns for each wheeling direction, thus amounting to about 1 µs in sum on the forward and back run of a data packet. Thereby, a considerable passage time accumulates for the cycle of a data packet via all slave-network subscribers 100 of the first network 10. By the portion of the passage times through the slave-network subscribers 100 of the entire passage time of a data packet in the first network 10, a minimum achievable passage time is limited in the first network 10.

A considerable portion of the passage time required for the wheeling of a data packet through a slave-network subscriber 100 may accumulate in the first interface 101 for establishing a physical connection and the second interface 102 for establishing a physical connection. For example, a cycle-time portion of about 250 ns each may accumulate in the first interface 101 and the second interface 102 for each wheeling direction.

Figure 2:
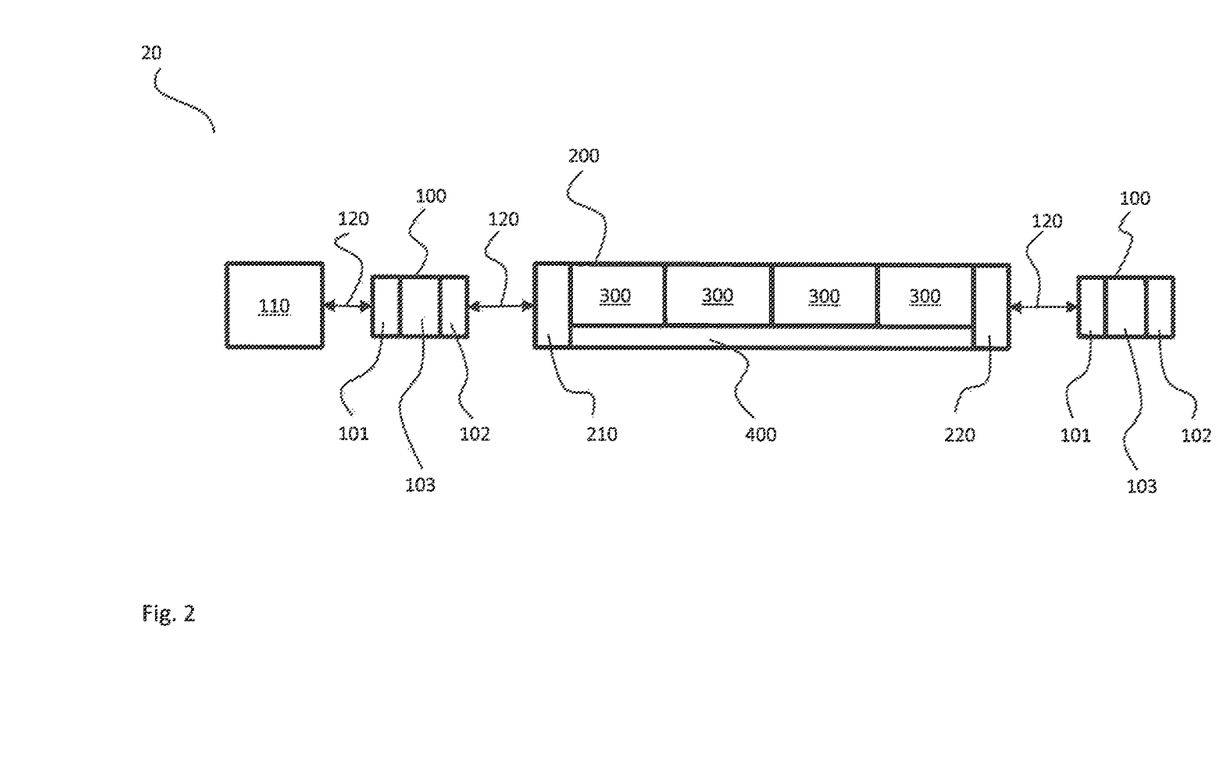
FIG. 2 depicts a second network having a network subscriber with a plurality of individual functional units.

FIG. 2 shows a schematic view of a second network 20. The second network 20 is also a data network for transmitting data between network subscribers of the second network 20. The second network 20, as well, may be a wireless network or a cable-based network. The second network 20 may e.g. be a network based on the Ethernet standard. Particularly, the second network may be a network operating on the EtherCAT standard and serve to interlink devices in industrial manufacture and/or for control or automation purposes.

The second network 20, in turn, comprises a master-network subscriber 110 configured as the master-network subscriber 110 of the first network 10. Furthermore, in the shown example the second network 20 comprises two slave-network subscribers 100 configured in the same manner as the slave-network subscriber 100 of the first network 10. Additionally, the second network 20 comprises a network subscriber 200 configured in accordance with the invention. The master-network subscriber 110, the slave-network subscriber 100 and the network subscriber 200 are exemplarily arranged in a row in a line topology and connected to each other by connections 120. Thereby, the network subscriber 200 is arranged between the two slave-network subscribers 100. The number of network subscribers 100, 200 and the shown topology of the second network 20 are, however, only exemplary and may be chosen differently.

According to the invention, the network subscriber 200 of the second network 20 serves to replace a plurality of slave-network subscribers 100. Several slave-application devices may be connected to the network subscriber 200. If the second network 20 is an EtherCAT network, the network subscriber 200 may e.g. be configured to connect a plurality of EtherCAT-application controllers.

The network controller 200 comprises a plurality of individual functional units 300. In the example shown in FIG. 2, the network subscriber 200 comprises four individual functional units 300. However, it is also possible to equip the network subscriber 200 with another number of individual functional units 300. Preferably, the network subscriber 200 comprises a higher number of individual functional units 300, e.g. 8 or 16 individual functional units.

Each individual functional unit 300 of the network subscriber 200 serves as an interface with a slave-application device, e.g. with an EtherCAT-application controller. In the example shown in FIG. 2, the network subscriber 200 is thus suitable to be connected to four slave-application devices, e.g. four EtherCAT-application controllers.

Apart from the individual functional units 300, the network subscriber 200 comprises shared functional units 400. The shared functional units 400 may respectively be used by a plurality of or by all individual functional units 300 of the network subscriber 200. The individual functional units 300 of the network subscriber 200 thus share the shared functional units 400. Due to the fact that the shared functional units 400 are provided only once in the network subscriber 200 and not once for each individual functional unit 300, the network subscriber 200 may advantageously have a particularly compact and inexpensive configuration.

Moreover, the network subscriber 200 comprises a first interface 210 for establishing a physical connection and a second interface 220 for establishing a physical connection. The interfaces 210, 220 of the network subscriber 200 serve to establish the connections 120 with the adjacent network subscribers of the second network 20. The network subscriber 200 may comprise further interfaces for establishing a physical connection which serves to establish further physical connections 120 with further adjacent network subscribers of the second network 20.

In the network subscriber 200, only one shared set of interfaces 210, 220 is provided for establishing a physical connection instead of one associated set of interfaces for each individual functional unit 300. This contributes to the compact and inexpensive configuration of the network subscriber 200. Moreover, this contributes to the fact that the portion of a passage time for wheeling a data packet through the network subscriber 200 accumulating in the interfaces 210, 220 for establishing a physical connection accumulates only once for each interface 210, 220 and wheeling direction instead of individually for each individual functional unit 300 of the network subscriber 200. This results in a passage time for the network subscriber 200 which is considerably shorter than the sum of passage times through a number of slave-network subscribers 100 corresponding to the number of individual functional units 300 of the network subscriber 200.

Figure 3:
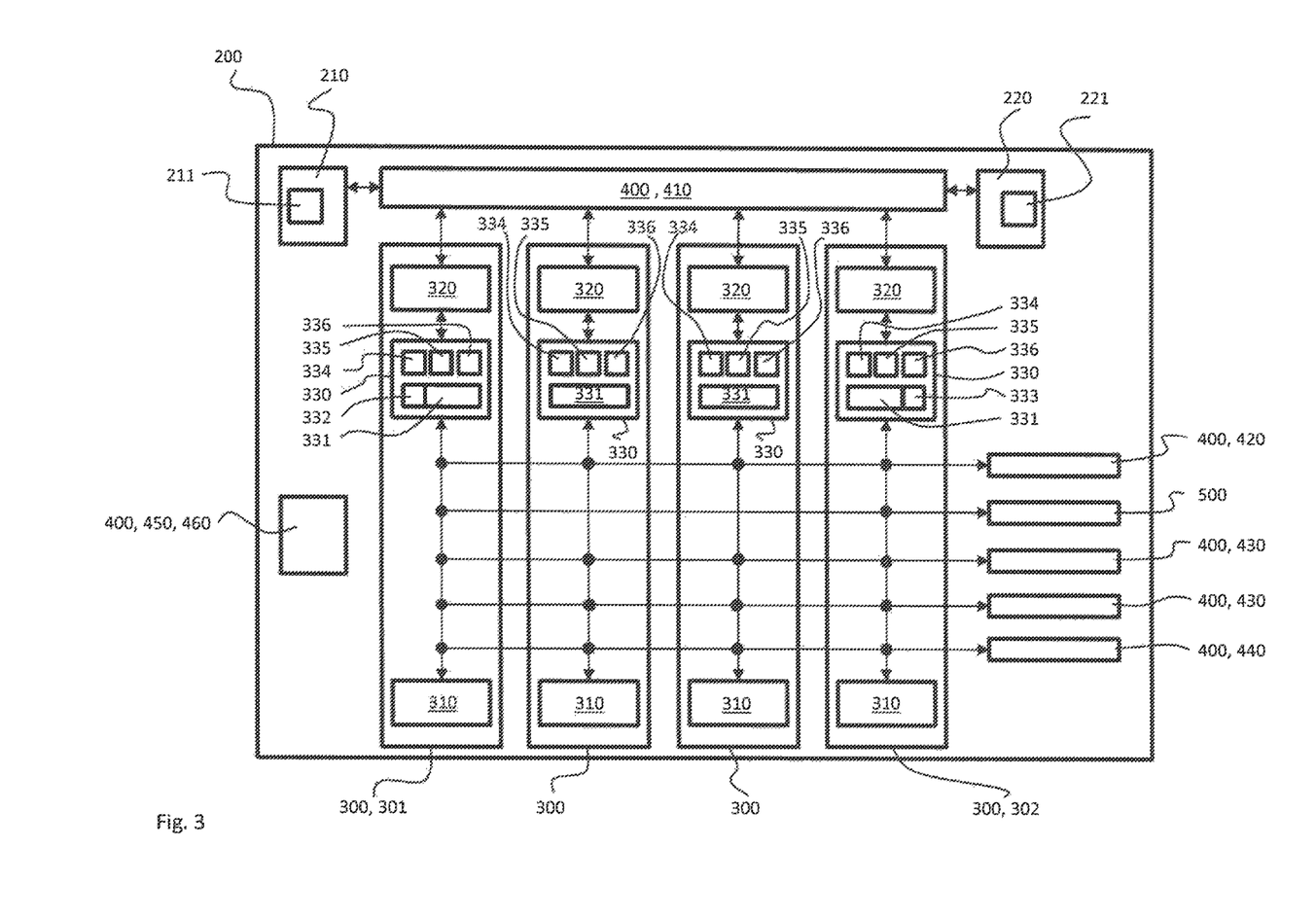
FIG. 3 shows a detailed view of the network subscriber having a plurality of individual functional units.

FIG. 3 shows a more detailed schematic view of the network subscriber 200 depicted in FIG. 2. The depicted number of four individual functional units 300 of the network subscriber 200 is, again, only exemplary. The network subscriber 200 may comprise a different number of individual functional units 300, e.g. 8 or 16 individual functional units 300.

The first interface 210 for establishing a physical connection of the network subscriber 200 comprises a first FIFO queue (first in-first out) 211. Correspondingly, the second interface 220 for establishing a physical connection of the network subscriber 200 comprises a second FIFO queue 221. The FIFO queues 211, 221 of the interfaces 210, 220 of the network subscriber 200 serve to buffer data transmitted and received via the interfaces 210, 220 of the network subscriber 200 in order to synchronize between the transmission clock on the connection and the internal processing clock. As the network subscriber 200 only comprises one set of interfaces 210, 220 for establishing a physical connection in spite of the plurality of individual functional units 300 with respective connectable slave-application devices, the network subscriber 200 only comprises one set of FIFO queues 211, 221. As a result, portions of a passage time accumulating during the wheeling of data packets through the network subscriber 200 only accumulate once respectively in the network subscriber 200.

Each individual functional unit 300 comprises an application interface 310. The application interface 310 may also be referred to as a process-data interface or as an application interface. The application interface 310 provides the actual interface for connecting a slave-application device to the respective individual functional unit 300 of the network subscriber 200. The application interface 310 may e.g. be configured as a digital I/O interface, as an SPI interface, as a synchronous or asynchronous microcontroller comprising 8 bit or 16 bit, as an on-chip bus, as a multi-purpose-I/O interface or as a different type of interface.

Furthermore, each individual functional unit 300 of the network subscriber 200 may comprise a memory-managing unit 320. If the network subscriber 200 is an EtherCAT network subscriber, the memory-managing unit 320 may also be referred to as a field-bus-memory-management unit (FMMU). The memory-managing unit 320 serves to image logical addresses to physical addresses of the respective individual functional unit 300 in a bit-wise manner.

Furthermore, each individual functional unit 300 may comprise a core unit 330. The core unit 330 may also be referred to as the core.

Each core unit 330 may comprise a register set 331. The register set 331 may e.g. comprise registers for configuring the respective individual functional unit 300 and for configuring a slave-application device connected via the application interface 310 of the respective individual functional unit 300.

The register set 331 of the core unit 330 of a first individual functional unit 301 of the individual functional units 300 of the network subscriber 200 comprises registers 332 for accessing the first interface 210 of the network subscriber 200. Said registers 332 for accessing the first interface 210 of the network subscriber 200 are only provided in the register set 331 of the core unit 330 of the first individual functional unit 301 instead of in the register sets 331 of the core units 330 of the remaining individual functional units 300.

The register set 331 of the core unit 330 of a second individual functional unit 302 of the individual functional units 300 of the network subscriber 200 comprises registers 333 for accessing the second interface 220 of the network subscriber 200. Such registers 333 for accessing the second interface 220 of the network subscriber 200 are not required for the remaining individual functional units 300 of the network subscriber 200 and thus do not have to be present for the remaining individual functional units 300 except for the second individual functional unit 302.

In an alternative configuration, the register set 331 of the core unit 330 of the first individual functional unit 301 of the individual functional units 300 of the network subscriber 200 also comprises the registers 333 for accessing the second interface 220 of the network subscriber 200. The second individual functional unit 302 is then configured in the same manner as the remaining individual functional units 300.

Furthermore, the core unit 330 of each individual functional unit 300 of the network subscriber 200 may comprise a volatile data memory 334. The volatile data memory 334 may e.g. have a size of 64 Kbyte. A first portion of the volatile data memory 334 may form the register set 331 of the respective core unit 330. A further portion of the volatile data memory 334 may serve as a processing memory. The memory-managing unit 320 of each individual functional unit 300 may serve to image logical addresses to physical addresses of the volatile data memory 334 of the core unit 334 of the respective individual functional unit 300 in a bit-wise manner.

Moreover, the core unit 330 of each individual functional unit 300 may comprise a SyncManager 335. The SyncManager 335 may serve to coordinate a data exchange between the master-network subscriber 110 of the second network 20 and the slave-application device connected to the respective individual functional unit 300 of the network subscriber 200 via the application interface 310.

The shared functional units 400 of the network subscriber 200 comprise a packet-processing unit 410. The packet-processing unit 410 is provided to at least partially process or pre-process data packets received via the interface 210, 220 for establishing a physical connection of the network subscriber 200. For example, the packet-processing unit 410 may be configured to recognize packet components of data packets received via the interfaces 210, 220, to examine check sums of data packets received via the interfaces 210, 220 and/or to generate check sums of data packets received via the interfaces 210, 220. The packet-processing unit 410 carries out these tasks in a centralized manner and only once for all individual functional units 300 of the network subscriber 200.

Furthermore, the packet-processing unit 410 serves to forward data packets received via the interfaces 210, 220 of the network subscriber 200 to the individual functional units 300 of the network subscriber 200 and to send out data packets generated and/or modified by the individual functional units 300 via the interfaces 210, 220 of the network subscriber 200.

The shared functional units 400 of the network subscribers 200 may comprise a chip interface 420 with a non-volatile data memory. The chip interface 420 may e.g. be configured as a I2C interface (inter-integrated circuit). The non-volatile data memory may e.g. be an EEPROM. The non-volatile data memory may e.g. serve to store configuration information for configuring the network subscriber 200 in a non-volatile manner.

The shared functional units 400 of the network subscriber 200 may furthermore comprise first portions 430 of a unit for managing a distributed time signal. The distributed time signal may be a time signal which is synchronized within the second network 200 between all network subscribers 100, 110, 200 of the second network 20. The first portions 430 of the unit for managing the distributed time signal may e.g. comprise one or several timers generating a receiving time and/or a system time.

In addition to the jointly used first portions 430 of the unit for managing the distributed time signal, the core unit 330 of each individual functional unit 300 may comprise two portions 336 of the unit for managing the distributed time signal. The second portions 336 of the unit for managing the distributed time signal are thus individually provided for each individual functional unit 300. The second portions 336 of the unit for managing the distributed time signal may e.g. each comprise a sync-signal unit for generating synchronous output signals and/or a latch-signal unit for providing input events with time stamps.

The shared functional units 400 of the network subscriber 200 may furthermore comprise one or several light-emitting diodes 440. The light-emitting diodes 440 may be provided to indicate status and activity information of the network subscriber 200.

The shared functional units 400 of the network subscriber 200 may furthermore comprise a clock-generating unit 450. The clock-generating unit 450 may serve to generate a clock signal used by the network subscriber 200.

Moreover, the shared functional units 400 of the network subscriber 200 may comprise a generating unit 460 for a reset signal. The generating unit 460 for the reset signal may serve to monitor a voltage supply and to manage external and internal reset signals.

The network subscriber 200 may furthermore comprise a management interface 500. The management interface 500 may serve to manage the first interface 210 for establishing a physical connection and the second interface 220 for establishing a physical connection. It is sufficient if only the first individual functional unit 301 and/or the second individual functional unit 302 may access the management interface 500.

A network subscriber comprises a plurality of individual functional units, a number of shared functional units, a first interface for establishing a physical connection and a second interface for establishing a physical connection. In this context, each individual functional unit comprises an application interface. Application-specific control devices, microcontrollers or other devices may be connected via the application interfaces of the individual functional units of this network subscriber. Since the network subscriber comprises a plurality of individual functional units each comprising an application interface, the network subscriber may in a network replace a plurality of conventional network subscribers having only one application interface. Since in this context the network subscriber only comprises one first interface for establishing a physical connection and only one second interface for establishing a physical connection, portions of a passage time required for wheeling a data packet through the network subscriber, said portions effected by the physical connections, advantageously only accumulate once for the first and second interface, respectively. Thereby, a passage time required for wheeling a data packet through the network subscriber may be considerably lower in the network subscriber than the sum of passage times for wheeling a data packet through a corresponding number of conventional network subscribers.

In an embodiment of the network subscriber, the shared functional units may be used by all individual functional units. Consequently, the shared functional units of the network subscribers advantageously do not have to be present in multiple form. This reduces the required space for the shared functional units. If the shared functional units are realized in an Asic, e.g. the required Asic resources may be reduced. This advantageously also reduces the manufacturing costs of the network subscriber.

In an embodiment of the network subscriber, the shared functional units comprise a chip interface with a non-volatile data memory and/or first parts of a unit for managing a distributed time signal and/or at least one light-emitting diode and/or a clock-generating unit and/or a generating unit for a reset signal. The chip interface with the non-volatile data memory may e.g. be a I2C interface with an EEPROM. The first parts of a unit for managing a distributed time signal may e.g. comprise a system-time transmitter and/or a receiving-time transmitter. The at least one light-emitting diode may e.g. be a light-emitting diode for signalling an operating state or an activity. The clock-generating unit may e.g. serve to generate an internally used clock signal. The generating unit for a reset signal may e.g. serve to monitor an operating voltage and manage external and internal reset signals. Advantageously, these shared functional units of the network subscriber simply have to be present in the network subscriber, allowing for a more compact and inexpensive configuration of the network subscriber than in the case of a corresponding number of conventional network subscribers with only one respective application interface.

In an embodiment of the network subscriber, the shared functional units comprise a packet-processing unit. As a result, it is advantageously not required to provide an associated packet-processing unit for each individual functional unit and each application interface. As a result, the network subscriber may advantageously be configured in a more space-saving and inexpensive manner.

In an embodiment of the network subscriber, the packet-processing unit is configured to recognize packet components of a packet received by the network subscriber and/or to examine a check sum and/or to generate a check sum. Advantageously, these tasks of the packet-processing unit are to be carried out in equal measure for each individual functional unit, thus allowing for configuring the packet-processing unit as a shared functional unit of the network subscriber.

In an embodiment of the network subscriber, each individual functional unit comprises a memory-managing unit. The memory-managing unit may also be referred to as a FMMU (field-bus-memory management unit). The memory-managing unit of each individual functional unit may e.g. serve to image logical addresses to physical addresses in a bit-wise manner.

In an embodiment of the network subscriber, each individual functional unit comprises a core unit. Within the core unit, components of the respective individual functional unit may be present in a bundled form whereas they would have to be provided separately in each individual functional unit.

In an embodiment of the network subscriber, each core unit comprises a register set and/or a volatile data memory and/or a SyncManager and/or second parts of a unit for managing a distributed time signal. In this context, the register set may e.g. serve to configure components of the respective individual functional units and of the network subscriber. The volatile data memory may e.g. serve as a processing memory. The SyncManager may e.g. serve to manage a data exchange between a master-network subscriber connected to the network subscriber and a device connected via the application interface of the respective individual functional unit of the network subscriber. The second parts of the unit for managing a distributed time signal may e.g. comprise a sync-signal and/or a latch-signal unit. The sync-signal unit may e.g. serve to generate synchronous output signals. The latch-signal unit may e.g. serve to provide input events with a precise time stamp.

In an embodiment of the network subscriber, the core unit of a first individual functional unit of the network subscriber comprises registers for accessing the first interface. Alternatively or additionally, the core unit of a second individual functional unit of the network subscriber comprises registers for accessing the second interface. As the network subscriber only commands the first interface for establishing a physical connection and the second interface for establishing a physical connection, only two of the individual functional units of the network subscribers have to comprise registers for accessing the interfaces. As a result, the remaining individual functional units of the network subscriber may advantageously have a particularly simple configuration.

In an embodiment of the network subscriber, said network subscriber comprises a management interface for managing the first interface and/or the second interface. The management interface may e.g. serve to configure the first interface for establishing a physical connection and/or the second interface for establishing a physical connection.

In an embodiment of the network subscriber, the management interface may only be accessed by a first individual functional unit and/or a second individual functional unit. As the network subscriber merely commands the first interface for establishing a physical connection and the second interface for establishing a physical connection, the management interface, too, only has to be accessible by two of the individual functional units of the network subscriber. As a result, the remaining individual functional units of the network subscriber advantageously have a particularly simple configuration.

In an embodiment of the network subscriber, the first interface comprises a first FIFO queue. Alternatively or additionally, the second interface comprises a second FIFO queue. The FIFO queues may e.g. serve to briefly latch data transmitted or received by the network subscriber. Advantageously, associated FIFO queues do not have to be provided for each individual functional unit in the network subscriber.

In an embodiment of the network subscriber, the first interface and the second interface are configured as Ethernet interfaces. Advantageously, the network subscriber may then be used in an Ethernet network.

In an embodiment of the network subscriber, said network subscriber is configured as an EtherCAT subscriber. Advantageously, the network subscriber may then be used in an EtherCAT network.

In an embodiment of the network subscriber, said network subscriber comprises at least 8, preferably at least 16 individual functional units. Advantageously, the network subscriber may thereby replace at least 8 or, respectively, at least 16 conventional network subscribers by only one application interface. Thereby, a passage time required for wheeling a data packet through the network subscriber is considerably reduced with regard to the sum of the passage times required for wheeling a data packet through 8 or 16 conventional network subscribers with only one respective application interface.

In an embodiment of the network subscriber, the application interfaces of the individual functional units are configured to connect EtherCAT-application controllers. The application interfaces may e.g. be configured as serial peripheral interfaces.

In an embodiment of the network subscriber, said network subscriber comprises at least one further interface for establishing a physical connection. This allows for directly connecting the network subscriber with more than two adjacent network subscribers. Thereby, the network subscribers may advantageously form a branching point in a network. For example, the network subscriber may form a node in a network having a tree or star topology.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

REFERENCE LIST 10 first network
20 second network
100 slave-network subscriber
101 first interface for establishing a physical connection
102 second interface for establishing a physical connection
103 processing unit
110 master-network subscriber
120 connection
200 network subscriber
210 first interface for establishing a physical connection
211 first FIFO queue
220 second interface for establishing a physical connection
221 second FIFO queue
300 individual functional unit
301 first individual functional unit
302 second individual functional unit
310 application interface
320 memory-managing unit
330 core unit
331 register set
332 register for accessing the first interface
333 register for accessing the second interface
334 volatile data memory
335 SyncManager
336 second portions of a unit for managing a distributed time signal
400 shared functional units
410 packet-processing unit
420 chip interface to a non-volatile data memory
430 first portions of a unit for managing a distributed time signal
440 light-emitting diode
450 clock-generating unit
460 generating unit for a reset signal
500 management interface

What is claimed is:

1. A network subscriber comprising:
a plurality of individual functional units, each individual functional unit comprising an application interface,
at least a shared functional unit,
a first interface for establishing a physical connection, and
a second interface for establishing a further physical connection,
wherein the shared functional unit comprises a packet-processing unit,
the packet-processing unit being connected to the plurality of individual functional units to forward data packets received via any of the first and the second interface to the individual functional units and to send out data packets generated and/or modified by the individual functional units via the any of the first and the second interfaces,
the packet-processing unit at least partially processing or pre-processing the data packets to establish the physical connections.

2. The network subscriber of claim 1, wherein the shared functional unit is used by all individual functional units.

3. The network subscriber of claim 1, wherein the shared functional unit comprises: a chip interface to a non-volatile data memory, and/or
first portions of a unit for managing a distributed time signal, and/or
at least a light-emitting diode, and/or
a clock-generating unit, and/or
a generation unit for a reset signal.

4. The network subscriber of claim 1, wherein the packet-processing unit is configured to recognize packet components of a packet received by the network subscriber and/or to examine a check sum and/or to generate a check sum.

5. The network subscriber of claim 1, wherein each individual functional unit comprises a memory-managing unit.

6. The network subscriber of claim 1, wherein each individual functional unit comprises a core unit.

7. The network subscriber of claim 6, wherein each core unit comprises: a register set, and/or
a volatile data memory, and/or a SyncManager, and/or
second portions of a unit for managing a distributed time signal.

8. The network subscriber of claim 6, wherein:
the core unit of a first individual functional unit comprises registers for accessing the first interface, and/or
the core unit of a second individual functional unit comprises registers for accessing the second interface.

9. The network subscriber of claim 1, wherein the network subscriber comprises a managing interface for managing the first interface and/or the second interface.

10. The network subscriber of claim 9, wherein the managing interface can only be accessed by a first individual functional unit and/or a second individual functional unit.

11. The network subscriber of claim 1, wherein the first interface comprises a first FIFO queue and/or the second interface comprises a second FIFO queue.

12. The network subscriber of claim 1, wherein the first interface and the second interface are configured as Ethernet interfaces.

13. The network subscriber of claim 1, wherein the network subscriber is configured as an EtherCAT subscriber.

14. The network subscriber of claim 13, wherein the application interfaces of the individual functional units are configured for the connection of EtherCAT application controllers.

15. The network subscriber of claim 1, wherein the network subscriber comprises at least one further interface for establishing another physical connection.

16. A network subscriber comprising:
a plurality of individual functional units, each individual functional unit comprising a memory-managing unit to image logical addresses to physical addresses of the respective individual functional unit,
at least a shared functional unit,
a first interface for establishing a physical connection, and
a second interface for establishing a further physical connection,
wherein the shared functional unit is interposed between the first and second interfaces and the memory-managing units of the plurality of individual functional units so that a data exchange between any of the first and second interfaces and the memory-managing units of the plurality of individual functional units is carried out via the shared functional unit.

17. The network subscriber of claim 16, wherein the shared functional unit is used by all individual functional units.

18. The network subscriber of claim 16, wherein the shared functional units comprise:
a chip interface to a non-volatile data memory, and/or
first portions of a unit for managing a distributed time signal, and/or at least a light-emitting diode, and/or
a clock-generating unit, and/or
a generation unit for a reset signal.

19. A network subscriber comprising:
a plurality of individual functional units, the individual functional units being arranged in a row with a first individual functional unit in a first end position and a second individual functional unit in a second end position and at least a further individual functional unit therebetween,
at least a shared functional unit,
a first interface for establishing a physical connection,
a second interface for establishing a further physical connection, and
a managing interface for managing the first interface and/or the second interface,
wherein the first individual functional unit and/or the second individual functional unit comprises registers for accessing the first interface and/or the second interface,
wherein the further individual functional unit between the first and second functional unit is formed without any register for accessing the first interface and/or the second interface, and
wherein the managing interface can only be accessed by the first individual functional unit and/or the second individual functional unit.

* * * * *